United States Patent
Mauro et al.

(10) Patent No.: US 9,992,334 B2
(45) Date of Patent: Jun. 5, 2018

(54) MULTI-MODAL CUSTOMER CARE SYSTEM

(75) Inventors: David Andrew Mauro, Montreal (CA); Vijay R. Raman, Pleasanton, CA (US)

(73) Assignee: Nuance Communications, Inc., Burlington, MA (US)

(*) Notice: Subject to any disclaimer, the term of this patent is extended or adjusted under 35 U.S.C. 154(b) by 95 days.

(21) Appl. No.: 13/416,086

(22) Filed: Mar. 9, 2012

(65) Prior Publication Data
US 2013/0094647 A1    Apr. 18, 2013

Related U.S. Application Data

(60) Provisional application No. 61/546,876, filed on Oct. 13, 2011.

(51) Int. Cl.
*H04M 3/00* (2006.01)
*H04M 3/51* (2006.01)
(Continued)

(52) U.S. Cl.
CPC .......... *H04M 3/5141* (2013.01); *H04M 3/493* (2013.01); *H04M 7/0042* (2013.01); *H04M 7/0054* (2013.01)

(58) Field of Classification Search
CPC ............. H04M 3/5166; H04M 3/5191; H04M 2203/2011; H04M 3/5237; H04M 7/0027;
(Continued)

(56) References Cited

U.S. PATENT DOCUMENTS 6,002,948 A    12/1999  Renko et al.
6,282,284 B1 *  8/2001  Dezonno et al. ........ 379/265.09
(Continued)

FOREIGN PATENT DOCUMENTS

EP    2214127       8/2010
JP    2002-374318   12/2002
(Continued)

OTHER PUBLICATIONS

Dictionary.com, "finite state machine," The Free On-Line Dictionary of Computing, Dennis Howe, http://dictonary.reference.com/browse/finite state machine, Accessed Aug. 4, 2015.*
(Continued)

*Primary Examiner* — Ahmad F Matar
*Assistant Examiner* — Kharye Pope
(74) *Attorney, Agent, or Firm* — Hamilton, Brook, Smith & Reynolds, P.C.

(57) ABSTRACT

Customer service and/or care providers generally have multiple communications channels (i.e., modes of communications, such as an Internet webpage, live agent telephones, Interactive Voice Response (IVR) system) of communication with which a customer may interact with the customer service provider. Currently, customers must select the communications channel by guessing which communications channel would best accommodate the customer's purpose/need for communicating with the customer service provider. In some scenarios, the customer may select the wrong communications channel because the selected channel is not able to service the customer's need. In another scenario, the customer may select a channel that is more cumbersome to service the customer's particular need than another channel of the customer service provider. Embodiments of the present invention provide an interface that integrates the multiple channels of the customer service provider and recommends a channel based on an identification of a customer service need of the customer.

23 Claims, 9 Drawing Sheets

(51) Int. Cl.
*H04M 5/00* (2006.01)
*H04L 12/66* (2006.01)
*H04M 3/493* (2006.01)
*H04M 7/00* (2006.01)

(58) Field of Classification Search
CPC ...... H04M 3/493; H04M 3/4938; H04M 3/51;
H04M 3/5175; H04M 2201/40; H04M
2201/38; H04M 3/4933; H04M 3/5183;
H04M 3/523; H04M 3/5232
USPC ........ 379/265, 266; 370/352, 353, 354, 355,
370/356, 357
See application file for complete search history.

(56) References Cited

U.S. PATENT DOCUMENTS

| | | | |
|---|---|---|---|
| 6,615,240 B1* | 9/2003 | Sullivan et al. | 709/205 |
| 6,760,727 B1* | 7/2004 | Schroeder et al. | |
| 6,826,194 B1* | 11/2004 | Vered et al. | 370/449 |
| 6,912,272 B2* | 6/2005 | Kirk et al. | 379/88.01 |
| 7,039,166 B1* | 5/2006 | Peterson et al. | 379/88.18 |
| 7,519,173 B2* | 4/2009 | Flores et al. | 379/265.01 |
| 7,881,439 B1* | 2/2011 | Cohn | H04M 3/4938 379/265.1 |
| 8,295,452 B1* | 10/2012 | Trandal et al. | 379/93.12 |
| 8,472,612 B1* | 6/2013 | Goringe et al. | 379/266.01 |
| 2002/0055974 A1* | 5/2002 | Hawkes et al. | 709/204 |
| 2003/0235287 A1* | 12/2003 | Margolis | H04L 29/06027 379/265.01 |
| 2004/0054743 A1* | 3/2004 | McPartlan et al. | 709/206 |
| 2004/0125938 A1* | 7/2004 | Turcan et al. | 379/265.02 |
| 2005/0066037 A1* | 3/2005 | Song | G06F 17/30861 709/227 |
| 2005/0105712 A1* | 5/2005 | Williams et al. | 379/265.02 |
| 2005/0190897 A1* | 9/2005 | Eberle et al. | 379/88.17 |
| 2005/0238046 A1 | 10/2005 | Hassan et al. | |
| 2005/0288961 A1* | 12/2005 | Tabrizi | 705/1 |
| 2006/0146992 A1* | 7/2006 | Paden et al. | 379/88.01 |
| 2007/0061736 A1 | 3/2007 | Newton et al. | |
| 2007/0116231 A1* | 5/2007 | DeGraaff | H04M 3/523 379/212.01 |
| 2007/0124238 A1* | 5/2007 | Hogg et al. | 705/38 |
| 2007/0192414 A1 | 8/2007 | Chen et al. | |
| 2007/0263838 A1* | 11/2007 | Wiseman et al. | 379/265.02 |
| 2008/0101339 A1* | 5/2008 | Forbes | H04L 12/66 370/352 |
| 2008/0160956 A1* | 7/2008 | Jackson | H04M 3/02 455/406 |
| 2008/0243744 A1* | 10/2008 | Isaacs | 706/46 |
| 2008/0311886 A1 | 12/2008 | Smith | |
| 2009/0003579 A1* | 1/2009 | Singh et al. | 379/211.01 |
| 2009/0006174 A1* | 1/2009 | Lauffer | 705/9 |
| 2009/0074184 A1* | 3/2009 | Baum | G06F 17/30017 380/205 |
| 2009/0149158 A1* | 6/2009 | Goldfarb et al. | 455/414.1 |
| 2009/0279538 A1* | 11/2009 | Merino Gonzalez et al. | 370/352 |
| 2009/0323675 A1* | 12/2009 | Raza | H04M 7/003 370/352 |
| 2010/0002859 A1 | 1/2010 | Hepworth et al. | |
| 2010/0002865 A1* | 1/2010 | Kennedy et al. | 379/265.11 |
| 2010/0158236 A1* | 6/2010 | Chang et al. | 379/265.03 |
| 2010/0161540 A1* | 6/2010 | Anisimov et al. | 706/47 |
| 2010/0198645 A1 | 8/2010 | Heiss et al. | |
| 2010/0299731 A1* | 11/2010 | Atkinson | 726/6 |
| 2010/0310059 A1* | 12/2010 | Davis et al. | 379/88.18 |
| 2011/0016051 A1 | 1/2011 | Trifiletti et al. | |
| 2011/0051918 A1* | 3/2011 | Fan et al. | 379/211.02 |
| 2011/0158398 A1* | 6/2011 | Kannan | H04L 12/1827 379/265.09 |
| 2011/0185293 A1* | 7/2011 | Barnett | H04L 67/02 715/760 |
| 2012/0265800 A1* | 10/2012 | Tuchman et al. | 709/203 |

FOREIGN PATENT DOCUMENTS

| | | |
|---|---|---|
| JP | 2007-532989 | 11/2007 |
| WO | WO 2002/065741 A2 | 8/2002 |
| WO | WO 2010/080323 A2 | 7/2010 |

OTHER PUBLICATIONS

Wagner, F., "A flowchart is not a state machine," downloaded from http://www.stateworks.com/active/download/TN9-Flowchart-is-not-State-Machine.pdf, Feb. 2005.

* cited by examiner

MULTI-MODAL CUSTOMER CARE SYSTEM

RELATED APPLICATION

This application claims the benefit of U.S. Provisional Application No. 61/546,876, filed on Oct. 13, 2011. The entire teachings of the above application are incorporated herein by reference.

BACKGROUND OF THE INVENTION

Communications between a first party (e.g., a customer) and a second party (e.g., customer service/care provider) may occur over at least one of multiple communications channels. For example, the first party may communicate with the second party via at least one of the following channels: live agent, Internet, electronic mail, text (e.g., Short Messaging Service (SMS)), and Interactive Voice Response (IVR) systems. Additionally, communications may occur over custom protocols or customer care types such as VoIP calls, instant messaging, and social networking systems or services.

SUMMARY OF THE INVENTION

An embodiment of the present invention is a method, system, or computer readable medium with program codes embodied thereon for communicating with a customer care provider having multiple channels of communication. For ease of reading, the term "system" is used in various portions of the description and may represent some or all forms of embodiments and implementations of the present invention, such as systems, methods, apparatuses, devices, computer readable media, network nodes, and networks.

The embodiment provides an interface to a customer that integrates a plurality of communications channels using respective media from a customer to the customer care provider. The embodiment determines a customer service need of the customer based on the customer's activity. For example, the determination may be based on a state of the interface. Further, the embodiment may recommend a communications channel for the customer to communicate with the customer care provider based on the customer service need of the customer.

The interface may support at least one of the following: a graphical user interface, visual display, and audio interface.

Based on the need of the customer, the embodiment may automatically select the communications channel by which the customer is to communicate with the customer care provider.

In addition, the embodiment may also determine capabilities of each of the plurality of communications channels of the customer care provider and recommend the at least one of the plurality of communications channels or select the at least one of the plurality of communications channels based on a combination of the customer service need and the capabilities of each of the plurality of communications channels of the customer care provider. For instance, the embodiment may match the capabilities of at least one of the plurality of communications channels with the customer service need of the customer.

The communications channel may also be recommended based on at least one of the following: customer preference, history of use, complexity of the customer service need, and ease of use of the at least one of the plurality of communications channels.

In addition, the embodiment may recommend a different communications channel of the plurality of communications channels in response to a change in state of a communications channel currently employed by the customer. For example, the embodiment may recommend the different communications channel in response to a change in the customer service need of the customer.

Additionally, the embodiment may also transfer identification and authorization information of the customer to the different communications channel state upon or after switching to the different communications channel.

Further, the embodiment may recommend a channel by enabling the customer to select a channel from the plurality of channels based on information of the capabilities of each channel. In addition, the information may include information about the differences in capabilities of each channel (e.g., wait to talk to a live agent vs. immediate access to a web based system). Also, the information may include availability information (e.g., accessibility) of a given channel corresponding to a given time location.

In response to recommending a different communications channel, the embodiment may also identify and direct the customer directly to a component of the different communications channel capable of servicing the customer service need of the customer. In addition, the embodiment may provide a one-time security Personal Identification Number (PIN) to the customer for secure access to the different communications channel. For instance, the PIN may be utilized to index to authentication information such as a numerical interactive voice response (IVR) system and an alphanumeric web user/password combination which may be used to facilitate login in authentication a customer across the plurality of communication channels.

Further, the plurality of communications channels may include at least one of the following: an interactive voice response (IVR) system, electronic mail, text messaging service and Internet. Additionally, the communications channels may include instant messaging service, VoIP calls, social networking systems or services, or other custom protocols/customer care types. It should be noted that the communications channel includes channels of any form of media communications between two parties and the lists provided above are merely example forms of communications channels. Other communications channels may be employed that enable two parties to communicate Another embodiment of the present invention relates to facilitating multiple modes of communications between a first party and a second party. The embodiment provides an interface to a first party that supports multiple modes of communications between the first party and the second party, where the multiple modes of communications are associated with respective channels. In addition, the embodiment determines whether to activate a channel with a second mode of communications based on the first party's interaction with the interface using a first mode of communications. In an event the first and second modes of communications have related states, the embodiment causes the second mode of communications to initialize to a state corresponding to the state of the first mode of communications.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Customer service and/or care providers generally have multiple communications channels (e.g., Internet, live agent, Interactive Voice Response (IVR) system) of communication with which a customer may interact with the customer service provider. Currently, customers must pick and choose the communications channel by guessing which communications channel would best accommodate the customer's purpose/need for communicating with the customer service provider. In some scenarios, the customer may select the wrong communications channel because the selected channel is not able to service the customer's need. In a different scenario, the customer may select a channel that is more cumbersome to service the customer's particular need than another channel of the customer service provider. Embodiments of the present invention provide an interface that integrates the multiple channels of the customer service provider and recommends a channel based on an identification of a customer service need of the customer.

Figure 1A:
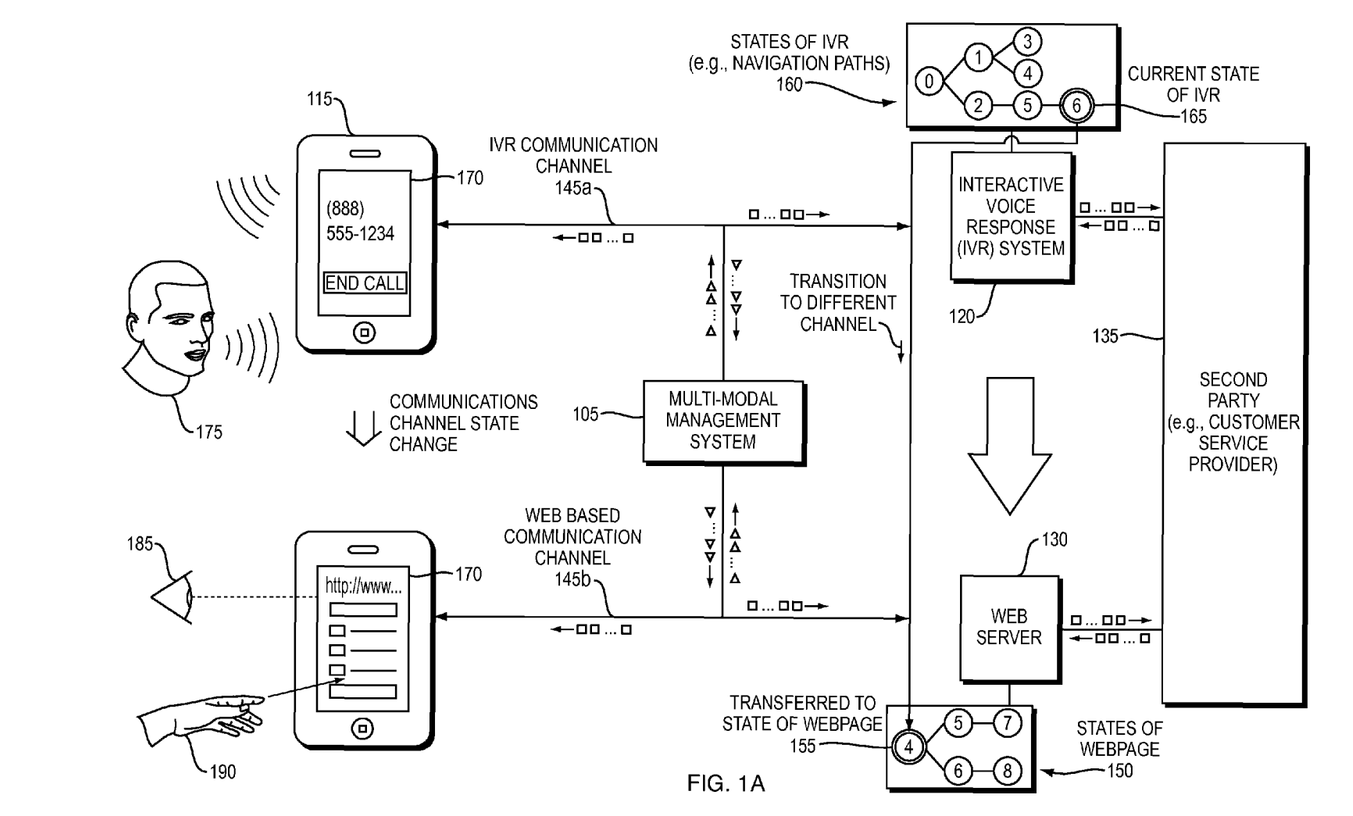
FIG. 1A is a network diagram illustrating a change in communications channel state change between a first party and a second party in accordance with an example embodiment of the present invention.

FIG. 1A is a network diagram illustrating a switch from a communications channel to a different communications channel between a first party (e.g., a customer) 175 and a second party (e.g., customer service provider) 135.

The first party 175, using a user device 115 having a graphical user interface 170, is in communications with a second party 135 via an Interactive Voice Response (IVR) system 120. The IVR system 120 enables the first party 175 to interact with a database of the second party 135.

For example, in telecommunications, the IVR system 120 allows customers 175 to interact with a company's database via a telephone keypad or by speech recognition, after which the customers 175 can service their own inquiries by following an IVR dialogue. In addition, the IVR system 120 may respond with a prerecorded or dynamically generated audio to direct users on how to navigate through states 160 of the IVR system 120. IVR system 120 can be applied to control almost any function where transactions can be broken down into a series of simple interactions.

Generally, two main varieties of speech recognition are used in IVR: i) those based upon predefined grammars (used in "directed" dialogues), and ii) those based on statistically trained language models (used in "natural language" dialogues). Directed dialogues prompt the caller with specific questions or options. Natural language dialogues that employ open questions (e.g., "How can I help you?") are more conversational and can interpret free-form responses.

In this example, a multi-modal management system 105 monitors an IVR communications channel 145a and provides an interface to the first party 175 that integrates a plurality of communications channels 145a-b. For example and as illustrated, the multi-modal management system 105 integrates IVR communications channel 145a and web based communications channel 145b. Although only two communications channels are illustrated, it should be known that the multi-modal management system 105 may integrate many more communications channels (e.g., live agent, text messaging service, instant messaging, and custom protocols, such as social networking services) used for communications between a first party 175 and a second party 135.

The IVR communications channel 145a enables a user to communicate with the IVR system 120 associated with the second party,. and the web based communications channel 145b enables a user to communicate with web server 130 associated with the second party. Both IVR systems 120 and web server 130 have associated state machines (160, 150) having states that represent choices available to a user to navigate through each respective media.

Based on a first party's need (e.g., purpose for communicating with the second party 135), one communications channel may be better suited to provide customer service to the first party 175. For example, a first party 175 may call a second party (e.g., an airline) to determine a status of a direct flight from Boston to Las Vegas. In this example, the first party 175 has begun communications using an IVR communications channel 145a. In order to obtain the flight information the first party 175 is interested in, the first party 175 must navigate through states 160 of the IVR system 120. Following receipt of the flight information, the first party 175 may determine that he would like to purchase alternate tickets. For instance, if the flight is canceled and the first party 175 wants to reach Las Vegas by a specific time, the first party 175 may want to look up alternate flights (direct or non-direct) to Las Vegas from Boston.

However, using the IVR system 120 may be cumbersome for the first party 175 because there may be a great number of flight options, each with different price points and departure/arrival times. In this scenario, using currently existing systems the first party 175 may wish to view the alternate flights on the airlines webpage. In such a scenario, the first party would generally have to terminate the communication with the IVR system 120 and initiate a new communications session with the web server 130 of the airline. Additionally, the first party 175 would have to navigate from an initial home page to a component of the web server 130 that is capable of displaying the alternate flights.

Embodiments of the present invention provide an interface (e.g., the multi-modal management system 105 or an interface (not shown) to which the multi-modal management system 105 is operatively coupled) that integrates the plurality of communications channels using respective media and recommends a communications channel based on a customer service need of the first party 175.

As stated above, the multi-modal management system 105 monitors communication signals between the user device 115 and the IVR system 120 via the IVR communications channel 145a. In addition, the multi-modal management system 105 may determine a customer service need of the first party 175 by monitoring states of the IVR system 135. It should be understood that the multi-modal management system 105 may change its state or state machine(s) within the multi-modal management system used to track state machines 160, 150 of the IVR 120 or web server 130. For instance, the multi-modal management system 105 may be able to determine a customer service need of the first party 175 because each state of the IVR system 135 has an associated function or requires specific user input. Based on the determined need, the multi-modal management system 105 may recommend a different communications channel via which the user may interact with the second party 135. Alternatively, the multi-modal management system 105 may determine that the first party 175 has reached a state of the IVR system 120 from which the first party may not navigate further and initiate a query to the first party 175 to determine the first party's customer service need.

In this example, the first party 175 is navigating through IVR system 120 to determine the current status of a flight from Boston to Las Vegas. The first party's navigation through the IVR system 120 leads the first party 175 to state 6 (165). The multi-modal management system 105 determines that the first party 175 is at state 6 of the state machine 160 of IVR system 120. Upon this determination, the multi-modal management system 105 may initiate a query to the first party 175 to determine a customer service need. Alternatively, the multi-modal management system 105 may automatically determine that the first party 175 may be interested in searching for alternative flights from Boston to Las Vegas.

Upon determining that the first party 175 would like to view additional flight options, the multi-modal management system 105 determines a communications channel that is best suited to service the first party's 175 customer service need. For example, the first party 175 interacts with IVR system 120 by listening to audio from the IVR system 120 and responding with voice commands (i.e., speech input). However, the multi-modal management system 105 is able to determine that such an interaction with the second party 135 is not feasible or not an optimal way for the first party 175 to determine alternative flight options because the listing of alternatives are read linearly, whereas a display allows alternatives to be presented in parallel.

Thus, the multi-modal management system 105 recommends a communications channel that allows the first party 175 to visually determine and select alternative flight options. In this example, the multi-modal management system 105 selects a web-based communications channel 145b as the appropriate communications channel for the first party 175 to interact with the second party 135. The multi-modal management system 105 enables the first party 175 to transfer from the IVR communications channel 145a to the web-based communications channel 145b by directing a first party 175 to an appropriate state, state 4 (155) of the state machine 150 of the Web server 130. The multi-modal management system 105 is able to determine the correct state to transfer the first party 175 to based on a mapping of all states of the communication interfaces (i.e., IVR system 120 and web server 130) with the second party 135.

In this example, the multi-modal management system 105 determines that state 4 (155) of the Web server 130 is able to provide the first party 175 with alternative flight information. Thus, the multi-modal management system 105 directs the first party 175 to state 4 (155) of the Web server 130. In addition, the multi-modal management system 105 transfers communications between the first party 175 and the second party 135 from the IVR communications channel 145a to the web-based communications channel 145b. In this state, the first party 175 is able to visually inspect the alternative flight options via the graphical user interface 170 of the user device 115. In addition, the first party 175 is able to select an alternative flight option by physically interacting with the graphical user interface 175 of the user device 115.

Figure 1B:
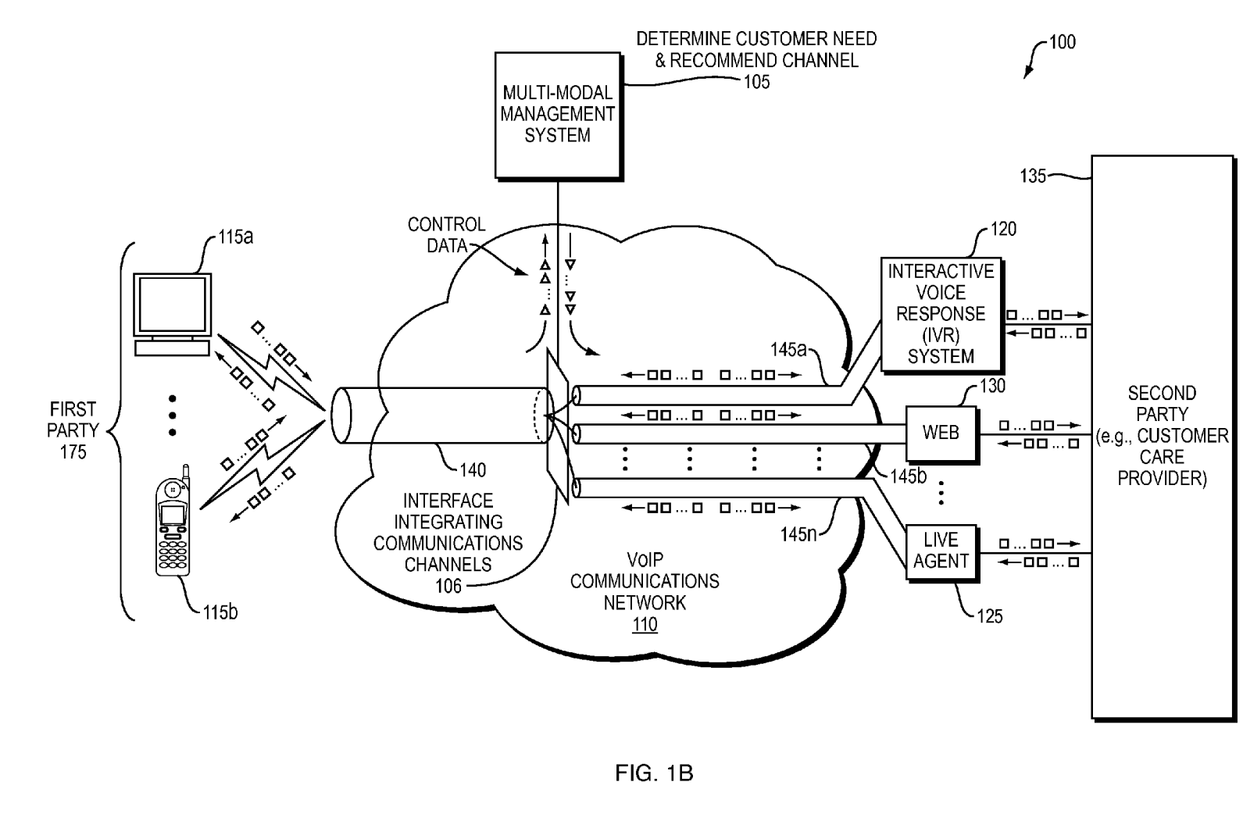
FIGS. 1B and 1C are network diagrams illustrating a multi-modal management system used to integrate a plurality of communications channels between a first party and a second party in accordance with an example embodiment of the present invention.
Figure 1C:
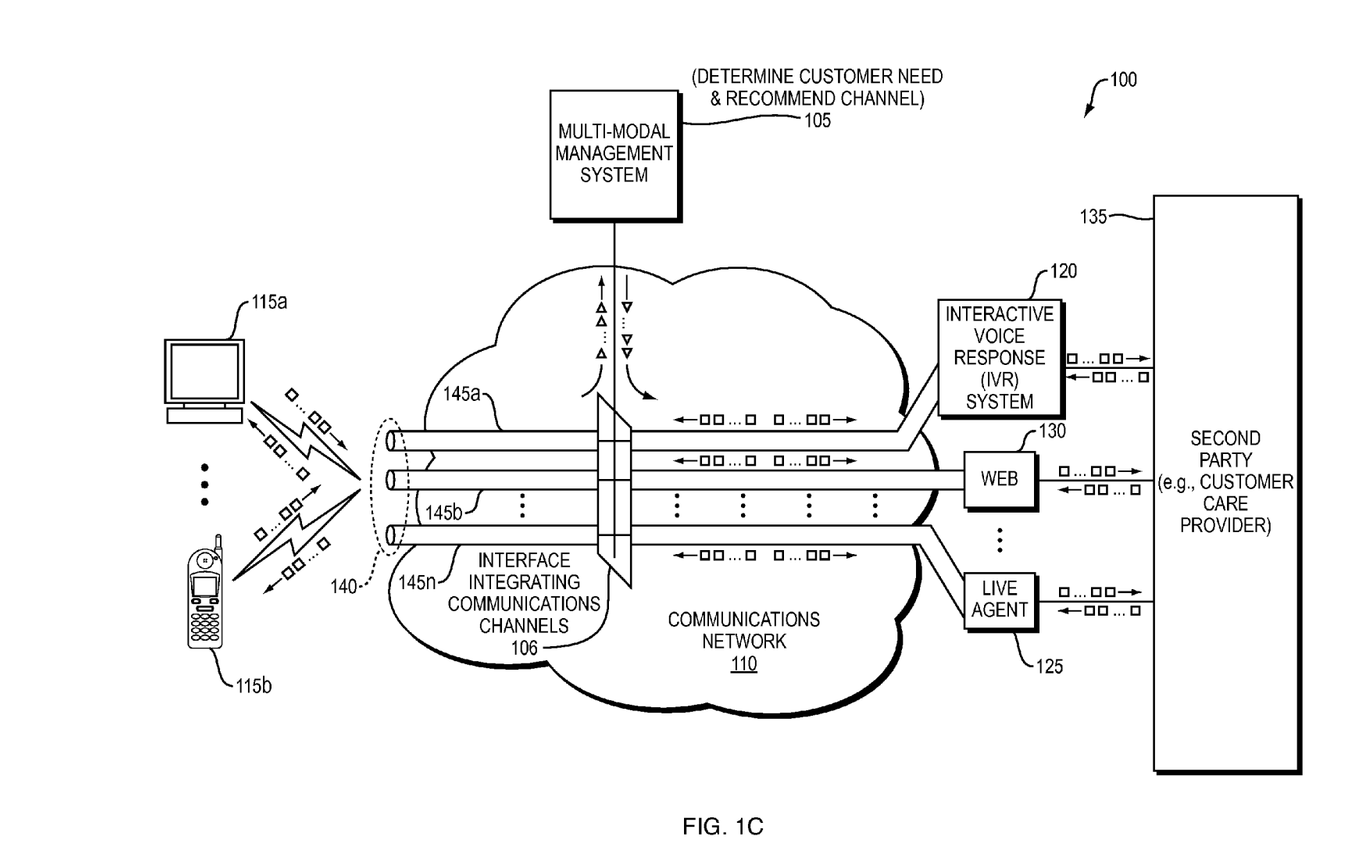

FIGS. 1B and 1C are network diagrams illustrating a multi-modal management system 105 used to integrate a plurality of communications channels 145a-n between a first party 175 and a second party 135.

The communication network 100 includes a collection of communication links interconnecting a plurality of nodes such as communication units 115a-b, multi-modal management system 105, IVR system 120, web server 130, live agent system 125, and second party 135. These internetworked nodes communicate by exchanging data packets according to a predefined set of network protocols, such as the Transmission Control Protocol/Internet Protocol (TCP/IP) and the Session Initiation Protocol (SIP). A network protocol as used herein is a formal set of rules that define how data is exchanged between nodes in a communication network.

The communication units 115a-b are conventional communication units, such as laptop computers, desktop computers, wireless transmit/receive units (WTRUs) (e.g., wireless telephones and personal digital assistants (PDAs)), IP telephones and the like, that enable, e.g., audible and/or visual communications to be converted into signals that are transferred to the access points via wireless links. Access points (not shown) interface the communication units 115a-b and IVR system 110, web-server 130, and live agent system 125 with the network 110 and enable signals to be transferred between the communication units 115a-b, IVR system 110, web-server 130, live agent system 125, and the network 100. Specifically, the access points convert signals received from the communication units 115a-b, IVR system 110, web-server 130, and live agent system 125 via wireless links into data packets that are transferred onto the network 100 as well as convert packets receive from the network into signals that are transferred to the communication units 115a-b and IVR system 110. Information (e.g., data, voice, and video) is typically conveyed between the communication units 115a-b and IVR system 110, web-server 130, and live agent system 125.

It should be noted that the present invention may be adapted to work with fixed, as well as mobile, devices that are able to communicate via a communications network. These fixed devices may include telephone units, personal computers and the like that are wired to a network.

The IVR system 120 is a telephony interface which allows users of the communication units 115a-b to interact with a database (not shown) (e.g., a customer service provider database) to acquire information from or enter data into the database via a telephone keypad or by speech recognition. For example, banks and credit card companies use IVR systems so that their customers can receive up-to-date account information instantly and easily without having to speak directly to a person. The Web Server 130 is a conventional Internet server used to deliver content (e.g., web pages) of the second party 135 to the first party 175 via the Internet. The live agent system 125 may be a call center having a plurality of live agents that answer phone calls to assist the first party 175 with customer service needs.

As stated above, the multi-modal management system 105 provides the interface 106 that integrates a plurality of communications channels 145a-n used to interface with the respective communications interfaces (IVR system 120, web server 130, and live agent system 125) of the second party 135. It should be noted that the communications channels 145a-n may be distinct logical channels over a single physical channel or distinct physical channels.

In this example, the multi-modal management system 105 provides the interface 106 to enable a user to communicate with the second party 135 using a single channel 140. The multi-modal management system 105 monitors the network 110 for a request to initiate a communications session with the second party 135. The multi-modal management system 105 then determines a customer service need associated with the first party 175 that issued the request. For instance, the multi-modal management system 105 may determine the customer service need at least by one of the following methods: i) analyzing the request, ii) issuing a request to the first party 175 for the customer service need, and iii) determining a state of one of the channels integrated by an interface 106.

In response to receiving the communications request and determining the customer service need of the first party 175, the multi-modal management system recommends a communications channel 145a-n for the first party 175 to communicate with the second party 135 based on the customer service need of the first party 175. Optionally, the multi-modal management system 105 may automatically select the communications channel 145a-n for the first party 175 to use to communicate with the second party.

In order to recommend the appropriate communications channel 145a-n, the multi-modal management system 105 must match the customer service need with the appropriate communications channel 145a-n. The multi-modal management system 105 may accomplish this by determining the capabilities of each of the plurality of communications channels 145a-n and matching the customer service need with the capabilities of the communications channels 145a-n.

The multi-modal management system 105 may determine the capabilities of each of the communications channels by inspecting state machines associated with each of the communication systems (e.g., IVR system 120, web server 130, and live agent system 125). The multi-modal management system may inspect each system to determine choices available to a user to navigate through the state machines of each of the systems and inputs and types of input required from the user for each state in order to transition to a next state. For instance, a state machine may require the user to input a credit card account number in order to pay a bill. In such a scenario, a first state would cause a request to be made to the first party requesting the account number. The state would then transition to a next state in response to receiving the account number. The next state may then request the user to input the amount the user would like to pay and the bank account number from which to obtain the funds to pay the inputted amount.

In addition, the multi-modal management system 105 may inspect each communication system associated with the communications channels 145a-n by monitoring real-time usage of each of the systems, issuing a request for a state machine mapping of each of the systems to the second party 135, or automatically walking through each of the states for each of the state machines.

In certain scenarios, the multi-modal management system 105 may determine that more than one communications channels 145a-b may be able to service a customer service need of the first party 175. The multi-modal management system 105 may then recommend/select a communications channel 145a-n based on at least one of the following: customer preference, history of use, complexity of the customer service need, or ease of use of each of the plurality of communications channels 145a-n.

After the multi-modal management system 105 has recommended a communications channel 145a-n, the first party may begin communications with the second party 135 via the communications channel 145a-n selected by the first party. During the communication session, the customer service need of the first party 175 may change. Alternatively, the first party 175 may have multiple customer service needs. The multi-modal management system 105 may determine the change in customer service need or additional customer service needs in response to a change in state of a communications channel currently employed by the first party 175.

For instance, as described above in reference to FIG. 1A, a first party 175 may reach a state of an IVR system 120 associated with an airline or airport notifying the first party 175 that a specific flight is canceled. In this scenario, the multi-modal management system 105 may determine that the user may wish to determine whether alternative flight options are available. Here, the multi-modal management system 105 is able to recognize that the web-based communications channel 145n would be more practical for the first party 175 to obtain information related to alternative flights. Thus, the multi-modal management system 105 would direct the first party 175 to the web-based communications channel 145n from the current IVR communications channel 145a by way of a recommendation or automatically transferring and displaying the second party's web page via the web-based communications channel 145n.

In addition, the multi-modal management system 105 may transfer any identification and authorization information associated with the first party 175 to the new communications channel. The transfer of such information enables the user to continue communicating with the second party via the new communications channel without having to re-enter any login, authentication, or security information that the first party may have previously entered during communications with the second party over the first communications channel. Further, the multi-modal management system 105 may provide the first party 175 with a one-time security Personal Identification Number (PIN) that enables the first party 175 to switch communications channels without having to re-enter any login, authentication, or security information.

FIG. 1C is a network diagram illustrating a similar communications network 100 employing a multi-modal management system 105. In this example, the communications channel 140 leading to interface 106 of the multi-modal management system 105 requires the first party to initiate communications with the second party 135 over a specific communications channel 145a-n. The multi-modal management system 105 then recommends different communications channels as described above.

Figure 2:
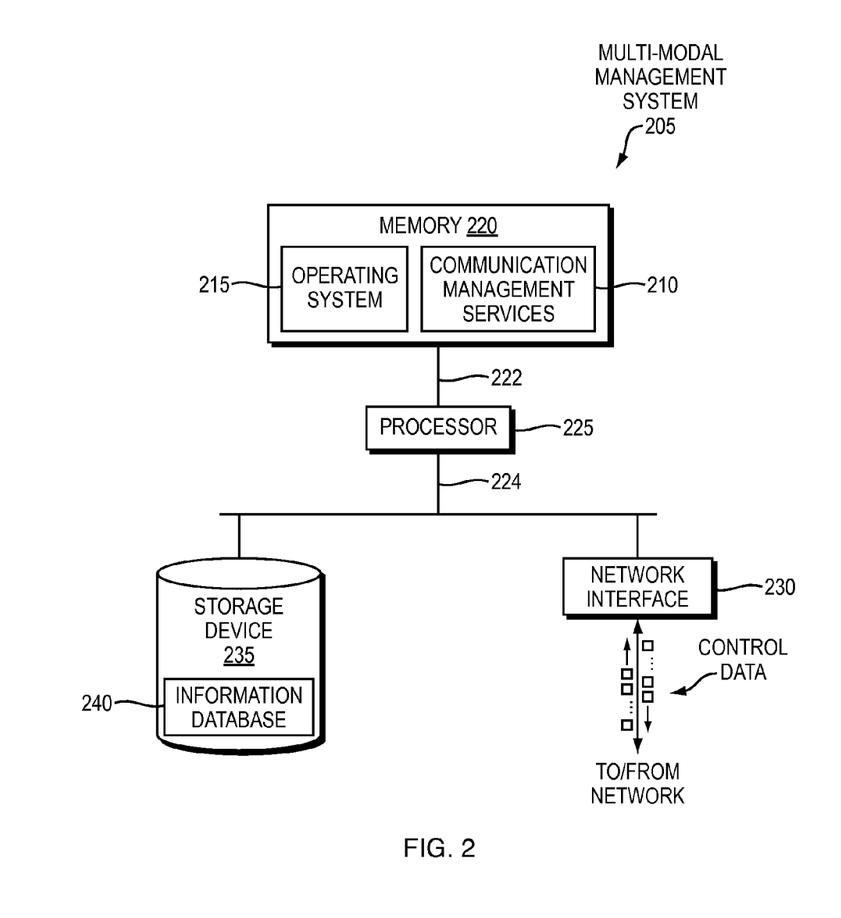
FIG. 2 is a block diagram of a multi-modal management system in accordance with an example embodiment of the present invention.

FIG. 2 is a block diagram of a multi-modal management system 205. Multi-modal management system 205 includes a memory 220 coupled to a processor 225 via a memory bus 222 and, a storage device 235 and a network interface 230 coupled to the processor 225 via an input/output (I/O) bus 224. It should be noted that multi-modal management system 205 may include other devices, such as keyboards, display units and the like. The network interface 230 interfaces the multi-modal management system 205 with the network 100 (see FIG. 1) and enables data (e.g., packets to be transferred between the second party 135 and other nodes (e.g., communication units 115a-b, IVR system 120, web server 230, and live agent system 125) in the network 100. To that end, network interface 230 comprises conventional circuitry that incorporates signal, electrical and mechanical characteristics, and interchange circuits, needed to interface with the physical media of the network 100 and protocols running over that media. Storage device 235 is a conventional storage device (e.g., a disk) capable of storing, inter alia, states of communication systems, state machines of the communication systems, capabilities of the communication systems.

The memory 220 is a computer-readable medium implemented as a RAM comprising RAM devices, such as DRAM devices and/or flash memory devices. The memory 220 contains various software and data structures used by the processor 225 including software and data structures that implement aspects of the present invention. Specifically, the memory 220 includes an operating system 215 and communication management services 210. The operating system 215 functionally organizes the multi-modal management system 205 by invoking operations in support of software processes and services executing on the multi-modal management system 205, such as communication management services 210. The communication management services 210, as will be described below, comprises non-transitory computer-executable instructions to communicate with a second party (e.g., customer care provider) having multiple channels of communication 145a-n.

The storage device 235 comprises information database 240, which is a data structure that is configured to hold various information used to enhance communications with an IVR system such as states of communication systems, state machines of the communication systems, capabilities of the communication systems.

Figure 3:
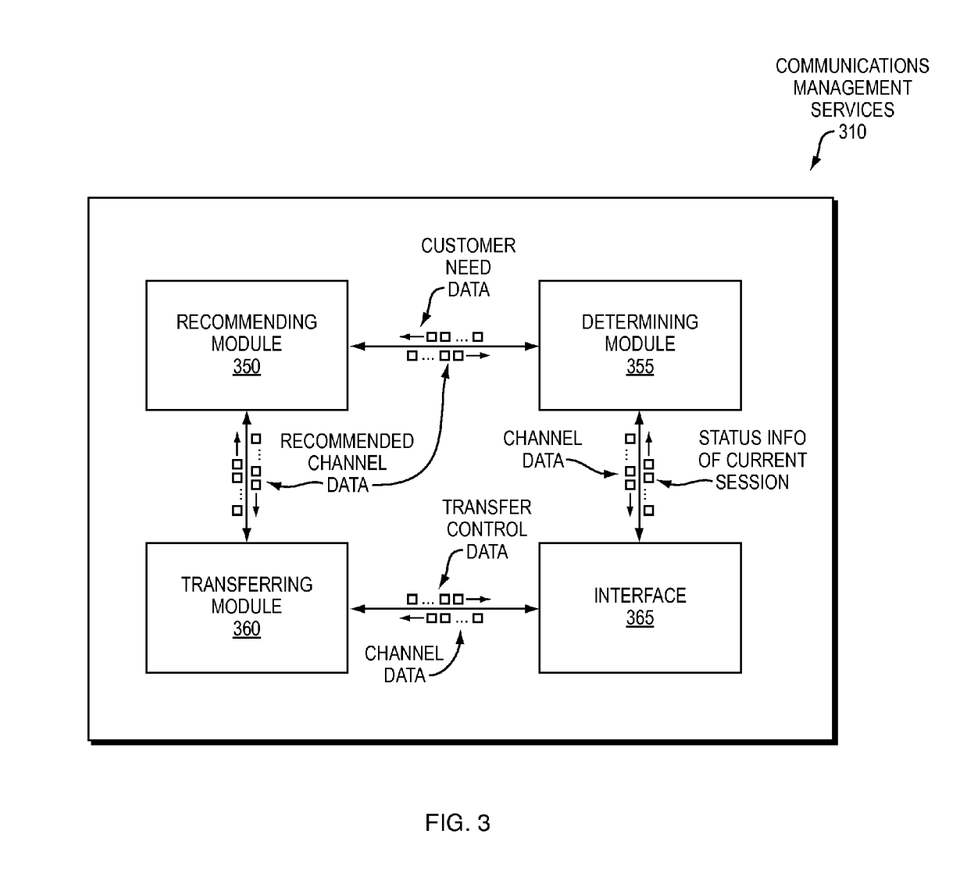
FIG. 3 is a block diagram of a communications management services module in accordance with an example embodiment of the present invention.

FIG. 3 is a block diagram of a communication management services module 310 that includes an interface 365, determining module 355, recommending module 350, and transferring module 360.

The interface 365 integrates a plurality of communications channels using respective media from a first party (e.g., customer) to a second party (e.g., customer care provider). The interface 365 monitors communication messages in the network 100 for requests to initiate a communication session with the second party having multiple channels of communication. In addition, the interface 365 monitors messages and status information related to a current communication session of a first party and a second party over a communications channel.

The interface 365 then passes this information to the determining module 355 that determines a customer service need of the customer. The customer service need may be determined in the methods as described above. The determining module 355 also inspects communication systems associated with the respective communications channels to determine the capabilities of each of the communication systems.

Using the customer service need and the capabilities of each of the communication systems associated with each of the respective communications channels, the recommending module 350 recommends a communications channel for the first party to use to communicate with the second party. In addition, the recommendation module 350 passes the recommended channel data to the transferring module 360 and the determining module 355.

The transferring module 360 then creates transfer control data that the interface 365 uses to transfer login, authentication, and security information associated with the first party to the recommended communications channel. In addition, the transferring module 360 may generate a one-time security PIN that enabled the first party to switch between communications channels without having to re-enter login information.

The interface 365 receives the recommended channel data and the transfer control data and enables the first party to switch to a different communications channel (i.e., the recommended channel).

Figure 4:
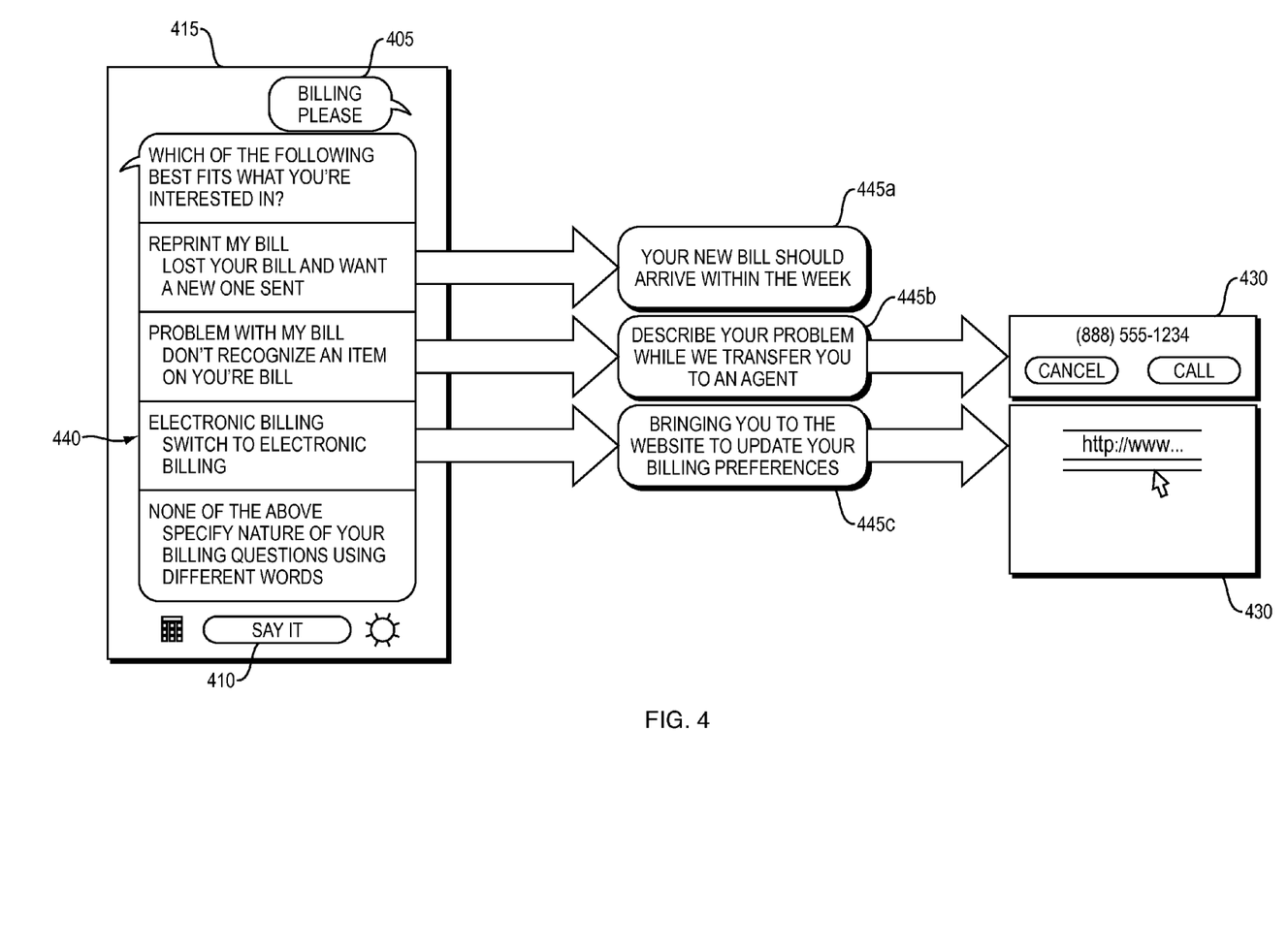
FIG. 4 is a graphical diagram illustrating the recommendation of a communications channel for communications between a first party and a second party.

FIG. 4 is a graphical diagram illustrating the recommendation of a communications channel for communications between a first party and a second party. In this example, a first party initiates a request to begin a communication session with a second party (e.g., a credit card company) using a communication device 415 having a graphical user interface 440. The multi-modal management system 105 receives this request and determines that the customer service need relates to a billing issue based on a user search query 405. The customer service need may be determined as described above. Further, the multi-modal management system 105 determines the search query is ambiguous by attempting to match the customer service need with capabilities of the communications channels of the second party.

In order to determine a precise customer service need of the first party, the multi-modal management system 105 presents the first party, via the graphical user interface 440, with several options to determine the exact nature of the customer service need. Once the first party has selected one of the options, the multi-modal management system 105 recommends a communications channel for the first party to use.

For example, if the first party identifies an inability to recognize an item on a bill, the multi-modal management system 105 will identify that this request may not be able to be addressed by an automated communications channel such as an IVR system or web-server. Thus, the multi-modal management system 105 directs the first party to a live agent by enabling the first party to begin dialing,. via a visual prompt 430, the phone number associated with a live agent system. Contemporaneously, the multi-modal management system 105 may issue a query 445b to enable the first party to describe the first party's problem.

Alternatively, if the first party selects electronic billing, the multi-modal management system 105 may direct the first party to a web server 430 by issuing a recommendation 445c for the first party to communicate with the second party via a communications channel associated with the second party's web server.

Figure 5:
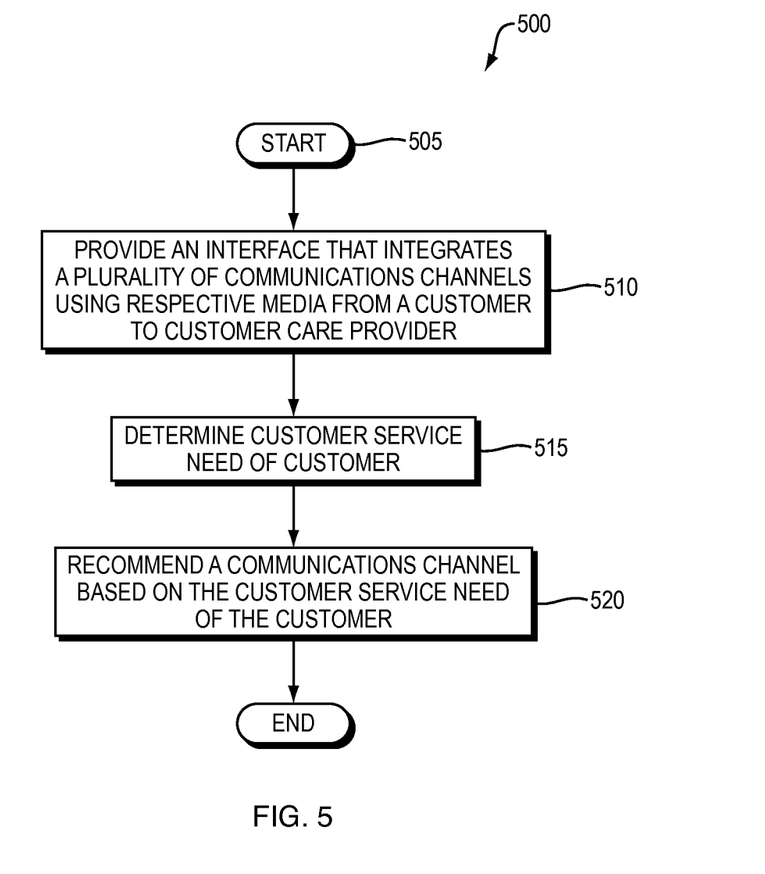
FIG. 5 is a flow diagram of an example method for communicating with a second party having multiple channels of communications.

FIG. 5 is a flow diagram of an example method 500 for communicating with a second party having multiple channels of communications. The method 500 begins at 505. At 510, the method 500 provides an interface that integrates a plurality of communications channels using respective media from a customer to a customer care provider. At 515, the method 500 determines a customer service need of the customer. Then, at 520, the method 500 recommends a communications channel based on the customer service need of the customer.

Figure 6A:
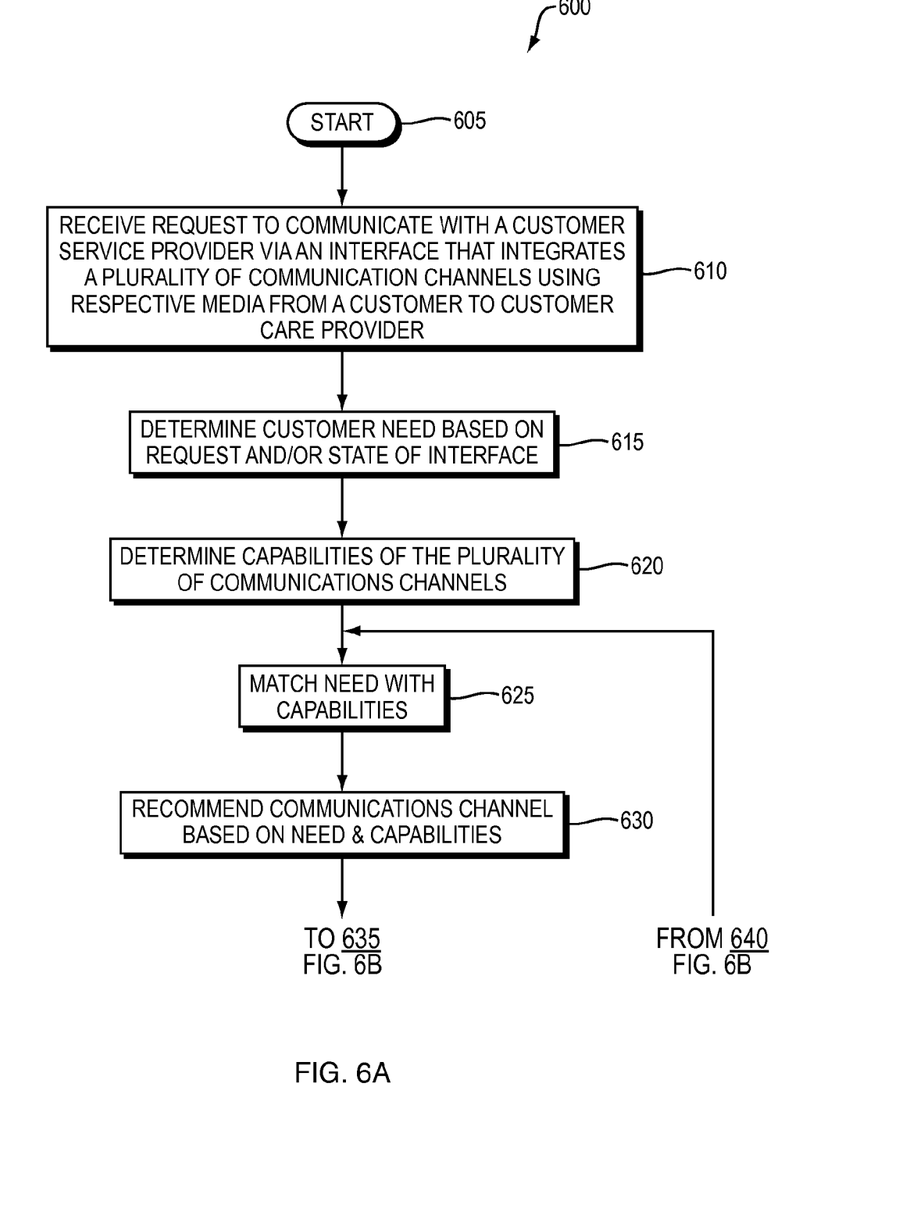
FIGS. 6A and 6B are flow diagrams of another example method for communicating with a second party having multiple channels of communications.
Figure 6B:
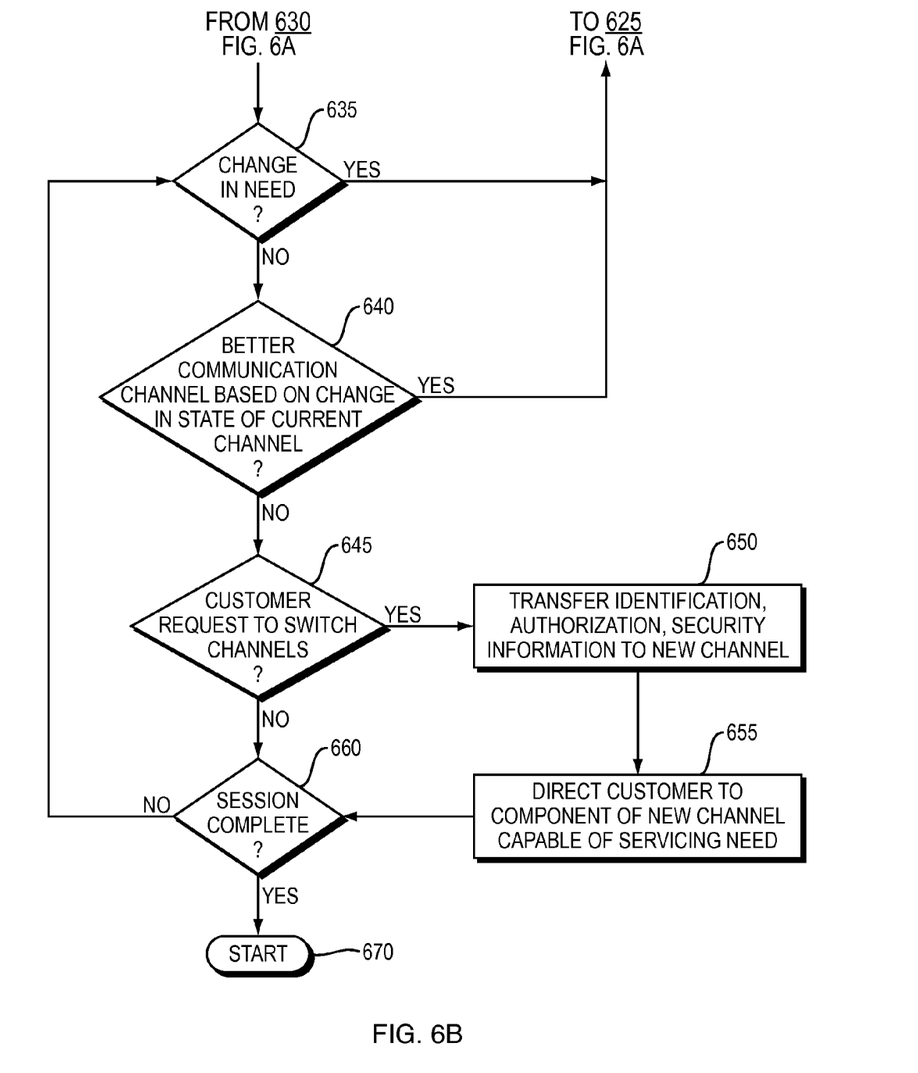

FIGS. 6A-B are flow diagrams illustrating another example method 600 for communicating with a second party having multiple channels of communications. Method 600 begins at 605. At 610, method 600 receives a request to communicate with a customer service provider via an interface that integrates a plurality of communications channels using respective media from a customer to a customer care provider. At 615, the method 600 determines a customer need based on the request and/or a state of the interface.

Further the method 600, at 620, determines the capabilities of the plurality of communications channels and, at 625, matches the customer need with the capabilities of the plurality of communications channels. At 630, the method 600 recommends a communications channel based on the customer need and capabilities of the plurality of communications channels.

The method 600, at 635, monitors the communication session to determine if there exists a change in customer service need of the customer. If so, at 625, method 600 matches the need with the capabilities of the plurality of communications channels. If not, method 600 determines whether a different communications channel is better suited to service a customer service need based on a change in state of the current communications channel. If so, the method 600 continues at 625. If not, the method 600, at 645, determines if the customer has switched to a different communications channel. If not, the method 600, at 660, determines whether the communications session has ended. If the session has ended, method 600 ends, at 670. If the session has not ended, method 600 continues at 635.

If, at 645, the method determined that the customer switched channels, method 600, at 650, transfers identification, authorization, and security information to the new channel. In addition, at 655, method 600 directs the customer to the component of the new channel capable of servicing the customer service need. Method 600 then continues at 660 as described above.

It should be understood that the block diagrams and flow diagrams presented herein are merely example representations of embodiments. The block diagrams and flow diagrams may include more or fewer blocks or states, have more or fewer interconnections, and the like. Other functions known in the art may be employed and are contemplated to be within the scope of the example embodiments presented herein.

Embodiments or aspects of the invention may be implemented in hardware, firmware, or software. If implemented in software, the software may be implemented in any software language capable of performing the embodiment(s) of the invention. The software may be stored on any computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for communicating with a customer care provider having multiple channels of communication, the method comprising:

providing an interface to a customer, the interface integrating a plurality of communications channels using respective media from a customer to the customer care provider;

determining a customer service need of the customer based on monitoring the customer's navigation of a plurality of states of an associated state machine of a communications channel, currently employed by the customer, to a current state of the interface;

automatically recommending at least one communications channel of the plurality of communications channels for the customer to communicate with the customer care provider based on the customer service need of the customer, wherein the recommending is based on determining the at least one communications channel of the plurality of communications channels that best accommodates a current purpose of the customer's communicating with the customer care provider as the current purpose of the customer's communicating changes, and determining the recommended communications channel that best accommodates the current purpose based on the recommended communications channel being a most relevant communications channel to use for the current purpose of the customer's communicating with the customer care provider, wherein the determining of the at least one communications channel includes: (i) establishing capabilities of each of the plurality of communications channels, and (ii) matching the established capabilities of the at least one communications channel with the determined customer service need, the recommending including recommending at least one different communications channel of the plurality of communications channels from the communications channel currently employed by the customer, and the recommending enabling the customer to select the at least one recommended different communications channel; and causing the different communications channel to initialize to a state of an associated state machine of the different communications channel corresponding to the current state of the interface, the causing the different communications channel to initialize to the state of the associated state machine of the different communications channel being based on a mapping of the plurality of states of the associated state machine of the communications channel currently employed by the customer to a plurality of states of the associated state machine of the different communications channel.

2. The method of claim 1 wherein recommending the at least one communications channel is based further on customer preference of the at least one communications channel for the purpose of the customer's communicating with the customer care provider.

3. The method of claim 1 wherein recommending a communications channel includes recommending the different communications channel of the plurality of communications channels in response to a change in state of the communications channel currently employed by the customer.

4. The method of claim 3 further comprising transferring identification and authorization information of the customer to the different communications channel upon or after switching to the different communications channel.

5. The method of claim 3 wherein recommending a different communications channel further includes directing the customer directly to a component of the different communications channel capable of servicing the customer service need of the customer.

6. The method of claim 3 further comprising providing a one-time security Personal Identification Number (PIN) to the customer for secure access to the different communications channel.

7. The method of claim 1 wherein the interface supports at least one of the following: a graphical user interface, visual display, and audio interface.

8. The method of claim 1 wherein the plurality of communications channels includes at least one of the following: an interactive voice response (IVR) system, electronic email, text messaging service and Internet.

9. A method for facilitating multiple modes of communications between a first party and a second party, the method comprising:
providing an interface to the first party, the interface supporting multiple modes of communications between the first party and the second party, the multiple modes of communications associated with respective channels;
based on the first party's interaction with the interface using a first mode of communications, determining whether to activate a channel with a second mode of communications, the determining being based on monitoring the customer's navigation, to a current state of the interface, of a plurality of states of an associated state machine of a communications channel of the first mode of communications, and deciding that at least one other mode of communications of the multiple modes of communications best accommodates a current purpose of the first party's communicating with the second party as the current purpose of the first party's communicating changes, and determining the at least one other mode of communications best accommodates the current purpose based on the at least one other mode of communications being a most relevant mode of communication to use for the first party communicating with the second party,
wherein the deciding of the at least one other mode of communications includes: (i) determining capabilities of each of the multiple modes of communications, and (ii) matching the determined capabilities of the at least one other mode of communications with a customer service need, and enabling the first party to select the at least one decided other mode of communications; and
causing the second mode of communications to initialize to a state of an associated state machine of the channel with the second mode of communications corresponding to the current state of the interface based on the first mode of communications, the causing the second mode of communications to initialize to the state of the associated state machine of the channel with the second mode of communications being based on a mapping of the plurality of states of the associated state machine of the communications channel of the first mode of communications to a plurality of states of the associated state machine of the channel with the second mode of communications.

10. A system for communicating with a customer care provider having multiple channels of communication, the system comprising:
an interface configured to integrate a plurality of communications channels using respective media from a customer to the customer care provider;
a determining module configured to determine a customer service need of the customer based on monitoring the customer's navigation of a plurality of states of an associated state machine of a communications channel, currently employed by the customer, to a current state of the interface; and
a recommending module configured to automatically recommend at least one communications channel of the plurality of communications channels for the customer to communicate with the customer care provider based on the customer service need of the customer, wherein the recommending is based on determining the at least one communications channel of the plurality of communications channels that best accommodates a current purpose of the customer's communicating with the customer care provider, as the current purpose of the customer's communicating changes, and determining the recommended communications channel that best accommodates the current purpose based on the recommended communications channel being a most relevant communications channel to use for the current purpose of the customer's communicating with the customer care provider,
wherein the determining of the at least one communications channel includes: (i) establishing capabilities of each of the plurality of communications channels, and (ii) matching the established capabilities of the at least one communications channel with the determined customer service need, the recommended at least one communications channel being at least one different communications channel of the plurality of communications channels from the communications channel currently employed by the customer, and the recommending enabling the customer to select the at least one recommended different communications channel; and
a transferring module configured to cause the different communications channel to initialize to a state of an associated state machine of the different communications channel corresponding to the current state of the interface, the causing the different communications channel to initialize to the state of the associated state machine of the different communications channel being based on a mapping of the plurality of states of the associated state machine of the communications channel currently employed by the customer to a plurality of states of the associated state machine of the different communications channel.

11. The system of claim 10 wherein the recommending module is configured to recommend the at least one communications channel based further on customer preference and of the at least one communications channel for the purpose of the customer's communicating with the customer care provider.

12. The system of claim 10 wherein the recommending module is further configured to recommend the different communications channel of the plurality of communications channels in response to a change in state of the communications channel currently employed by the customer.

13. The system of claim 12 further comprising a transferring module configured to transfer identification and authorization information of the customer to the different communications channel upon or after switching to the different communications channel.

14. The system of claim 10 wherein the recommending module is further configured to direct the customer directly to a component of the different communications channel capable of servicing the customer service need of the customer.

15. The system of claim 12 further comprising a security module configured to provide a one-time security Personal Identification Number (PIN) to the customer for secure access to the different communications channel.

16. The system of claim 10 wherein the interface supports at least one of the following: a graphical user interface, visual display, and audio interface.

17. The system of claim 10 wherein the plurality of communications channels includes at least one of the following: an interactive voice response (IVR) system, email, text messaging service, and Internet.

18. A system for facilitating multiple modes of communications between a first party and a second party, the system comprising:
   an interface configured to support multiple modes of communications between the first party and the second party, the multiple modes of communications associated with respective channels of communications;
   a determining module configured to determine, based on the first party's interaction with the interface using a first mode of communications, whether to activate a channel with a second mode of communications, the determining being based on monitoring the customer's navigation, to a current state of the interface, of a plurality of states of an associated state machine of a communications channel of the first mode of communications, and deciding that at least one other mode of communications of the multiple modes of communications best accommodates a current purpose of the first party's communicating with the second party as the current purpose of the first party's communicating changes, and determining the at least one other mode of communications best accommodates the current purpose based on the at least one other mode of communications being a most relevant mode of communication to use for the first party communicating with the second party,
   wherein the deciding of the at least one other mode of communications includes: (i) determining capabilities of each of the multiple modes of communications, and (ii) matching the determined capabilities of the at least one other mode of communications with a customer service need, and enabling the first party to select the at least one decided other mode of communications;
   a transferring module configured to cause the second mode of communications to initialize to a state of an associated state machine of the channel with the second mode of communications corresponding to the current state of the interface based on the first mode of communications, the causing the second mode of communications to initialize to the state of the associated state machine of the channel with the second mode of communications being based on a mapping of the plurality of states of the associated state machine of the communications channel of the first mode of communications to a plurality of states of the associated state machine of the channel with the second mode of communications.

19. A computer readable medium having computer readable program codes embodied therein for communicating with a customer care provider having multiple channels of communication, the computer readable program codes including instructions that, when executed by a processor, cause the processor to:
   provide an interface to a customer, the interface integrating a plurality of communications channels using respective media from a customer to the customer care provider;
   determine a customer service need of the customer based on monitoring the customer's navigation of a plurality of states of an associated state machine of a communications channel, currently employed by the customer, to a current state of the interface;
   automatically recommend at least one communications channel of the plurality of communications channels for the customer to communicate with the customer care provider based on the customer service need of the customer, wherein the recommending is based on determining the at least one communications channel of the plurality of communications channels that best accommodates a current purpose of the customer's communicating with the customer care provider as the current purpose of the customer's communicating changes, and determining the recommended communications channel that best accommodates the current purpose based on the recommended communications channel being a most relevant communications channel to use for the current purpose of the customer's communicating with the customer care provider,
   wherein the determining of the at least one communications channel includes: (i) establishing capabilities of each of the plurality of communications channels, and (ii) matching the established capabilities of the at least one communications channel with the determined customer service need, the recommended at least one communications channel including at least one different communications channel of the plurality of communications channels from the communications channel currently employed by the customer, and the recommending enabling the customer to select the at least one recommended different communications channel; and
   cause the different communications channel to initialize to a state of an associated state machine of the different communications channel corresponding to the current state of the interface, the causing the different communications channel to initialize to the state of the associated state machine of the different communications channel being based on a mapping of the plurality of states of the associated state machine of the communications channel currently employed by the customer to a plurality of states of the associated state machine of the different communications channel.

20. A computer readable medium having computer readable program codes embodied therein for facilitating multiple modes of communications between a first party and a second party, the computer readable program codes including instructions that, when executed by a processor, cause the processor to:
   provide an interface to a first party, the interface supporting multiple modes of communications between the first party and the second party, the multiple modes of communications associated with respective channels of communications;
   based on the first party's interaction with the interface using a first mode of communications, determine whether to activate a channel with a second mode of communications, the determining being based on monitoring the customer's navigation, to a current state of the interface, of a plurality of states of an associated state machine of a communications channel of the first mode of communications, and deciding that at least one other mode of communications of the multiple modes of communications best accommodates a current purpose of the first party's communicating with the second party as the current purpose of the first party's communicating changes, and determining the at least one other mode of communications best accommodates the current purpose based on the at least one other mode of communications being a most relevant mode of communication to use for the first party communicating with the second party, wherein the deciding of the at least one other mode of communications includes: (i) determining capabilities of each of the multiple modes of communications, and (ii) matching the determined capabilities of the at least one other mode of communications with a customer service need, and enabling the first party to select the at least one decided other mode of communications, and to cause the second mode of communications to initialize to a state of an associated state machine of the channel with the second mode of communications corresponding to the current state of the interface based on the first mode of communications, the causing the second mode of communications to initialize to the state of the associated state machine of the channel with the second mode of communications being based on a mapping of the plurality of states of the associated state machine of the communications channel of the first mode of communications to a plurality of states of the associated state machine of the channel with the second mode of communications.

21. The method of claim 1 wherein automatically recommending the communications channel is further based upon differences in capabilities between two or more of the plurality of communications channels.

22. The method of claim 1 wherein automatically recommending the communications channel is further based upon availability of a given channel of the plurality of communications channels corresponding to a given time.

23. The method of claim 1 wherein the state of the associated state machine includes a plurality of states of the state machine and at least one transition between states of the plurality of states of the state machine.

* * * * *